United States Patent
Gaur

(10) Patent No.: US 9,877,073 B2
(45) Date of Patent: Jan. 23, 2018

(54) SUSPEND MODE OF STREAMING FOR SEAMLESS USER EXPERIENCE

(71) Applicant: SLING MEDIA PVT LTD, Bangalore (IN)

(72) Inventor: Dushyant Gaur, Bangalore (IN)

(73) Assignee: Sling Media PVT Ltd., Bangalore (IN)

(*) Notice: Subject to any disclaimer, the term of this patent is extended or adjusted under 35 U.S.C. 154(b) by 7 days.

(21) Appl. No.: 14/797,493

(22) Filed: Jul. 13, 2015

(65) Prior Publication Data
US 2017/0019709 A1    Jan. 19, 2017

(51) Int. Cl.
| | |
|---|---|
| H04N 7/18 | (2006.01) |
| H04N 7/173 | (2011.01) |
| H04N 21/442 | (2011.01) |
| H04L 29/06 | (2006.01) |
| H04B 1/3827 | (2015.01) |
| H04N 21/41 | (2011.01) |
| H04N 21/433 | (2011.01) |
| H04N 21/44 | (2011.01) |

(Continued)

(52) U.S. Cl.
CPC ..... *H04N 21/44209* (2013.01); *H04B 1/3827* (2013.01); *H04L 65/1066* (2013.01); *H04L 65/4076* (2013.01); *H04L 65/605* (2013.01); *H04N 21/4126* (2013.01); *H04N 21/4147* (2013.01); *H04N 21/432* (2013.01); *H04N 21/436* (2013.01); *H04N 21/437* (2013.01); *H04N 21/4325* (2013.01); *H04N 21/4333* (2013.01); *H04N 21/4334* (2013.01); *H04N 21/44* (2013.01); *H04N 21/44227* (2013.01); *H04N 21/6112* (2013.01); *H04N 21/6118* (2013.01); *H04N 21/6125* (2013.01); *H04N 21/6143* (2013.01); *H04N 21/6587* (2013.01)

(58) Field of Classification Search
None
See application file for complete search history.

(56) References Cited

U.S. PATENT DOCUMENTS

| | | | |
|---|---|---|---|
| 6,751,802 B1 * | 6/2004 | Huizer | G06T 9/007 348/E7.071 |
| 8,965,354 B2 | 2/2015 | Hilton | |

(Continued)

*Primary Examiner* — James R Sheleheda
(74) *Attorney, Agent, or Firm* — Lorenz & Kopf LLP

(57) ABSTRACT

A method for placeshifting media content with the use of a suspend mode includes the steps of receiving media content at a placeshifting device, receiving a request at the placeshifting device from a mobile device to initiate transmission of the media content from the placeshifting device to the mobile device, and in response to the request, transmitting the media content from the placeshifting device to the mobile device. The method further includes the steps of detecting an interruption of the transmission of the media content and based on the detecting the interruption, entering a suspend mode at the placeshifting device wherein transmission of the media content is temporarily suspended. Still further, the method includes the steps of detecting a resumption of ability to transmit media content and based on the detecting the resumption, exiting the suspend mode and resuming transmitting the media content from the placeshifting device to the mobile device. The resumed transmission begins a point in time of the media content at which entry into the suspend mode occurred.

15 Claims, 3 Drawing Sheets

(51) Int. Cl.
*H04N 21/4147* (2011.01)
*H04N 21/437* (2011.01)
*H04N 21/432* (2011.01)
*H04N 21/6587* (2011.01)
*H04N 21/61* (2011.01)
*H04N 21/436* (2011.01)

(56) References Cited

U.S. PATENT DOCUMENTS

| | | | | |
|---|---|---|---|---|
| 9,106,946 B2* | 8/2015 | Asmussen | | H04N 7/147 |
| 2005/0028200 A1* | 2/2005 | Sardera | | G06Q 30/02 |
| | | | | 725/42 |
| 2010/0169934 A1 | 7/2010 | Kennedy | | |
| 2011/0093885 A1* | 4/2011 | Ravula | | H04N 7/17336 |
| | | | | 725/32 |
| 2011/0283313 A1* | 11/2011 | Gathen | | H04N 21/2747 |
| | | | | 725/37 |
| 2011/0311204 A1* | 12/2011 | Adimatyam | | H04N 5/44543 |
| | | | | 386/295 |
| 2012/0108264 A1* | 5/2012 | Martz | | H04W 24/00 |
| | | | | 455/456.2 |
| 2012/0291077 A1* | 11/2012 | Aaby | | H04N 21/235 |
| | | | | 725/93 |
| 2013/0019275 A1* | 1/2013 | Pierce | | H04B 1/202 |
| | | | | 725/106 |
| 2013/0074132 A1* | 3/2013 | Hasek | | H04N 21/2747 |
| | | | | 725/93 |
| 2014/0066042 A1* | 3/2014 | Hilton | | G01S 19/14 |
| | | | | 455/418 |
| 2014/0126706 A1* | 5/2014 | Barbulescu | | G06Q 30/0267 |
| | | | | 379/88.01 |
| 2014/0187221 A1* | 7/2014 | Ramachandran | | H04W 4/001 |
| | | | | 455/418 |
| 2015/0150046 A1* | 5/2015 | Maharajh | | G06F 17/30035 |
| | | | | 725/34 |
| 2015/0237100 A1* | 8/2015 | Barbulescu | | H04L 65/602 |
| | | | | 709/219 |

* cited by examiner

SUSPEND MODE OF STREAMING FOR SEAMLESS USER EXPERIENCE

TECHNICAL FIELD

The present disclosure relates generally to methods and apparatus for streaming media, such as audio and/or video data, to a cellphone, smartphone, tablet computer, PDA, or the like, using a place shifting device. Particularly, in the event that the streaming media data connection is interrupted due to an incoming phone call, a network switch, or other cause of data interruption, the methods and apparatus provide a "suspend mode" for the media stream that allows the user to resume streaming upon the resumption of the data connection from the point in the streaming session where the data connection was interrupted.

BACKGROUND

Recently, consumers have expressed significant interest in "place shifting" devices that allow viewing of television or other media content at locations other than their primary television set. Placeshifting devices typically packetize media content that can be transmitted over a local or wide area network to a portable computer, mobile phone, personal digital assistant, remote television or other remote device capable of playing back the packetized media stream for the viewer. Placeshifting therefore allows consumers to view their media content from remote locations such as other rooms, hotels, offices, and/or any other locations where portable media player devices can gain access to a wireless or other communications network.

One class of portable media player devices that can receive a placeshifted media stream are mobile devices, such as cellphones, smartphones, tablet computers, PDAs, and the like. A mobile device is a handheld device that allows users to access information, keep track of their busy schedules, and communicate with others. These devices are becoming more and more ubiquitous because they help users manage their busy schedules, as well as communicate with the world. A typical mobile device can function as a mobile or cellular phone, internet-enabled device, and personal organizer.

Currently, when using a mobile device to view place-shifted media, during short interrupts like phone calls, network changeovers/drops, etc., the placeshifting session is terminated and streaming experience is interrupted. When the user returns to streaming, he/she loses the video to be watched as the streaming session is recreated afresh. As such, there is a continuing need in the art for systems and methods that allow for a better user streaming experience using mobile devices with place shifting devices in the event of a data streaming interrupt event. It would be desirable to provide such methods and apparatus that allow the user to resume the streaming experience from the point of interruption without having to restart/start over at the beginning of the media content, or to re-initiate the data connection with the placeshifting device. These and other desirable features and characteristics will become apparent from the subsequent detailed description and the appended claims, taken in conjunction with the accompanying drawings and this background section.

BRIEF SUMMARY

The present disclosure relates generally to methods and apparatus for streaming media, such as audio and/or video data, to a cellphone, smartphone, tablet computer, PDA, or the like, using a place shifting device. In one exemplary embodiment, a method for placeshifting media content with the use of a suspend mode includes the steps of receiving media content at a placeshifting device, receiving a request at the placeshifting device from a mobile device to initiate transmission of the media content from the placeshifting device to the mobile device, and in response to the request, transmitting the media content from the placeshifting device to the mobile device. The method further includes the steps of detecting an interruption of the transmission of the media content and based on the detecting the interruption, entering a suspend mode at the placeshifting device wherein transmission of the media content is temporarily suspended. Still further, the method includes the steps of detecting a resumption of ability to transmit media content and based on the detecting the resumption, exiting the suspend mode and resuming transmitting the media content from the placeshifting device to the mobile device. The resumed transmission begins a point in time of the media content at which entry into the suspend mode occurred.

In another exemplary embodiment, a placeshifting device configured for placeshifting media content with the use of a suspend mode includes a content interface configured for receiving media content at a placeshifting device a communications interface configured for: a) receiving a request at the placeshifting device from a mobile device to initiate transmission of the media content from the placeshifting device to the mobile device and b) in response to the request, transmitting the media content from the placeshifting device to the mobile device. The placeshifting device further includes a suspend mode module configured for: a) detecting an interruption of the transmission of the media content, b) based on the detecting the interruption, entering a suspend mode at the placeshifting device wherein transmission of the media content is temporarily suspended, c) detecting a resumption of ability to transmit media content, and d) based on the detecting the resumption, exiting the suspend mode and resuming transmitting the media content from the placeshifting device to the mobile device, wherein the resumed transmission begins a point in time of the media content at which entry into the suspend mode occurred.

This brief summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Exemplary embodiments will hereinafter be described in conjunction with the following drawing figures, wherein like numerals denote like elements, and wherein.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Embodiments of the present disclosure are generally directed to methods and apparatus that relate to streaming media, such as audio and/or video data, to a mobile device using a place shifting device. Particularly, in the event that the streaming media data connection is interrupted due to an incoming phone call, a network switch, or other cause of data interruption, the systems and methods provide a "suspend mode" for the data stream that allows the user to resume streaming upon the resumption of the data connection from the point in the streaming session where data connection was interrupted.

As used herein, the term "suspend mode" refers to the state when the ongoing session between the placeshifting device and the mobile device client is suspended due to an interrupt like a phone call to the mobile device client or network errors. Once the mobile device client has handled the interrupt, the suspend mode is ended and the mobile device client will resume the media streaming session. As such, upon interrupt, the streaming media session will be suspended and hence the session need not be re-established once the interrupt has ended. Instead, the streaming media session will be resumed from where (i.e., the point in the media stream) it was suspended. During the suspended mode, the transcoded/streaming data is preserved on the placeshifting device as well as the mobile device client so as to resume the streaming with minimal or no data loss.

Figure 1:
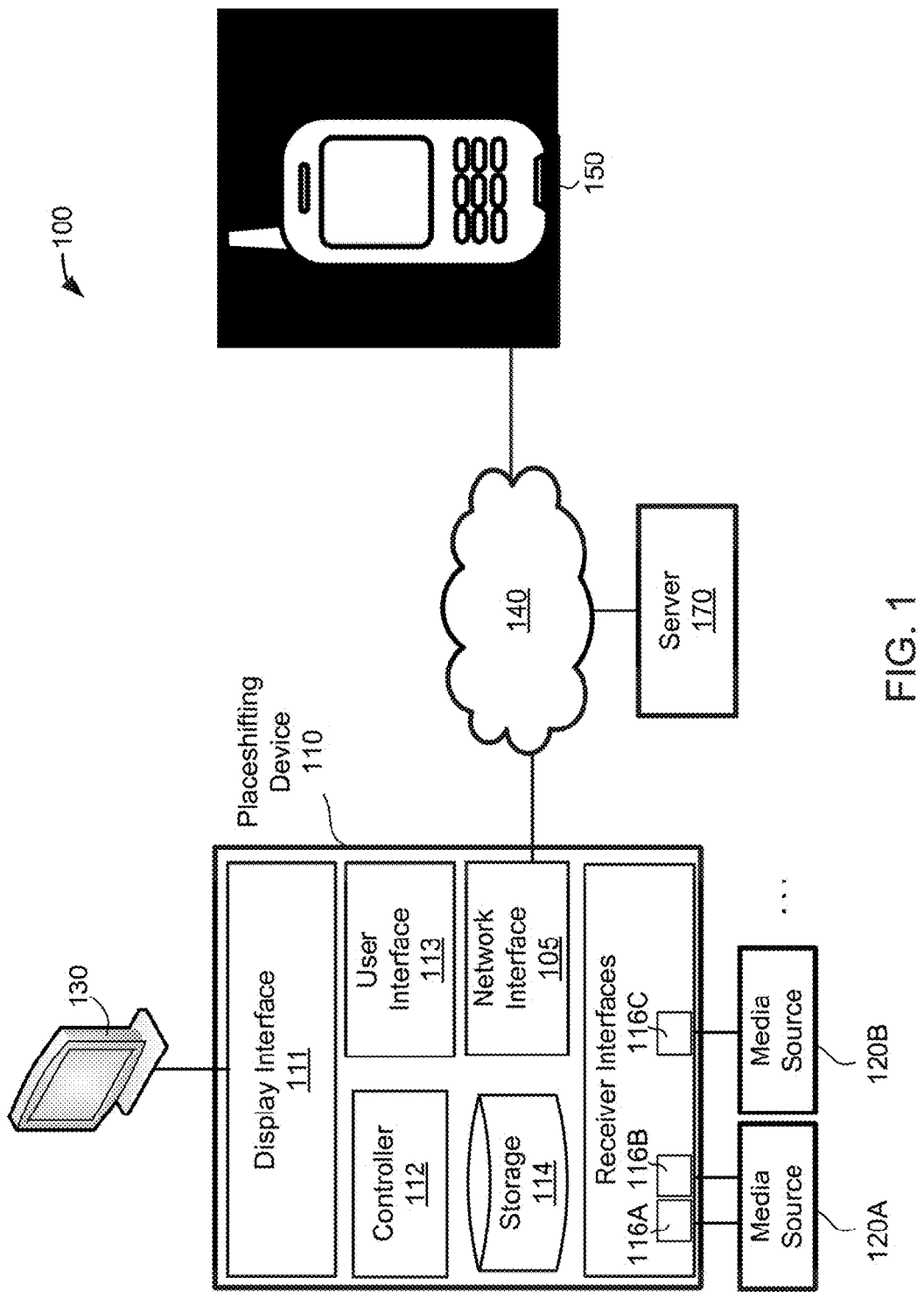
FIG. 1 is a conceptual overview of an exemplary place-shifting system that is suitable for use with the described embodiments.

Referring now to FIG. 1, an exemplary placeshifting system 100 useful in the present embodiments will now be described. As shown, a placeshifting system 100 generally includes a placeshifting device 110 that receives media content from one or more media sources 120, encodes the received content into a suitable format (e.g., a streaming format), and then transmits the encoded media stream to a media player 150 over a network 140 (e.g., a cellular telephone network, a WLAN, the Internet, etc.). Media player 150 receives the encoded stream, decodes the stream, and presents the decoded content to a viewer on a television or other such display 160, such as a mobile device. Similarly, the content may be viewed locally (with respect to placeshifting device 110) via a display 130. In various embodiments, a server 170 may also be provided to communicate with placeshifting device 110 and/or media player 150 via network 140 to assist these devices in locating each other, maintaining security, providing or receiving content or information, and/or any other features as desired.

Media sources 120 (120A, 120B, etc.) may include a wide range of sources now known or later developed, including, for example, broadcast television, cable television, satellite television, "video-on-demand" or similar sources, digital video disk (DVD) players and other removable media, video camera systems, video game consoles, set-top box (STB) systems, Internet media sources (e.g., YouTube), and the like. Media sources 120 will also typically include one or more output interfaces (not illustrated).

Placeshifting device 110 includes any combination of software and/or hardware configured to perform the functionality described herein. In the illustrated embodiment, for example, placeshifting device 110 includes a display interface 111 (coupled to display 160), a network interface 115 (coupled to network 140), and one or more receiver interfaces 116 (116A, 116B, etc.) coupled to media sources 120. Receiver interfaces 116 include any set of interfaces now known or later developed, such as HDMI, component video, and composite video interfaces. As shown, a particular media source 120 may be coupled to one or more receiver interfaces 116A. Thus, for example, media source 120A is coupled to both receiver interfaces 116A and 116B, while media source 120B is coupled to receiver interface 116C. A receiver interface 116 may have a selectable capability of receiving and decoding copy-protected media content. For example, in the case of an HDMI/HDCP interface, placeshifting device 110 may disable or enable HDCP compliance on that interface (e.g., by resetting the HDMI interface and refusing HDCP hand-shaking from media source 120).

Placeshifting device 110 includes a user interface module 113 configured to provide interaction between the user and placeshifting device 110 (e.g., via various menus, remote control devices, and other conventional user interface components).

Placeshifting device 110 also includes a controller 112 for coordinating the operation of other components of placeshifting device 110, and suitable storage (e.g., hard disk and/or solid state drives) 114 for storing data received from media sources 120 as well as other data associated with operation of placeshifting device 110. The particular methods described herein may be implemented, for example, using software executable by controller 112, and then presented to the user via display 130 and/or display 160. As described in further detail below, controller 112 has a "placeshifting mode" (during which placeshifting device 110 performs placeshifting) and a "pass-through mode" (during which placeshifting device 110 simply allows media content to pass through—e.g., to display 130).

It will be appreciated that placeshifting device 110 will typically include a number of additional hardware and/or software components (e.g., memory, controllers, digital signal processors, etc.), which have been left out of the illustration in the interest of simplicity. For example, placeshifting device 110 will typically incorporate an encoder and/or transcoder module configured to convert audio/video or other data from media sources 120 into a packetized format that can be transmitted over network 140.

Placeshifting device 110 may also include a transmit buffer module that temporarily stores encoded data prior to transmission over network 140 and adjusts one or more parameters of the encoding (e.g., the bit rate of the media stream) to maintain desirable picture quality and data throughput in view of the then-current network performance. Placeshifting device may also be configured to provide commands to one or more of the media sources 120, e.g., to request a desired input signals from that media source. Such commands may be provided over any convenient wired or wireless interface, such as an infrared or other wireless transmitter that emulates remote control commands receivable by the media source 120. The SLINGBOX® products available from Sling Media, Inc. of Foster City, Calif. are one exemplary placeshifting device.

In some embodiments, placeshifting device 110 incorporates all or a portion of the functionality typically associated with a particular media source 120. For example, placeshifting device 110 might be a hybrid STB or other receiver that provides transcoding and placeshifting features. Such a device may receive satellite, cable, broadcast and/or other signals that encode television programming or other content received from an antenna, modem, server and/or other source. Such devices may also include a content database (stored, for example, within storage 114) to support a personal or digital video recorder (DVR) feature or other content library as appropriate. Stated another way, in some embodiments, media source 120 and placeshifting device 110 are physically and/or logically contained within a common component, housing or chassis.

In some embodiments, placeshifting device 110 is a software application configured to be executed on a conventional computing system (e.g., a personal computer, tablet computer, smartphone, or the like). In such embodiments, placeshifting device 110 may encode some or all of a screen display typically provided to a user of the computing system for placeshifting to media player 150. One device capable of providing such functionality is the SlingProjector® product available from Sling Media, Inc.

Media player 150 may be any device, component, module, hardware, software and/or the like capable of receiving a media stream placeshifting device 110. In various embodiments, media player 150 is a desktop computer, a laptop computer, a tablet computer, a mobile phone, a personal digital assistant, a personal media player (such as the ARCHOS™ products available from the Archos Co. of Igny, France) or the like. In many embodiments, media player 150 is a general purpose computing device that includes a media player application that is capable of securely connecting to placeshifting device 110 and receiving and presenting media content to the user of the device as appropriate. In a particular embodiment, media player device is the mobile device as described above.

Figure 2:
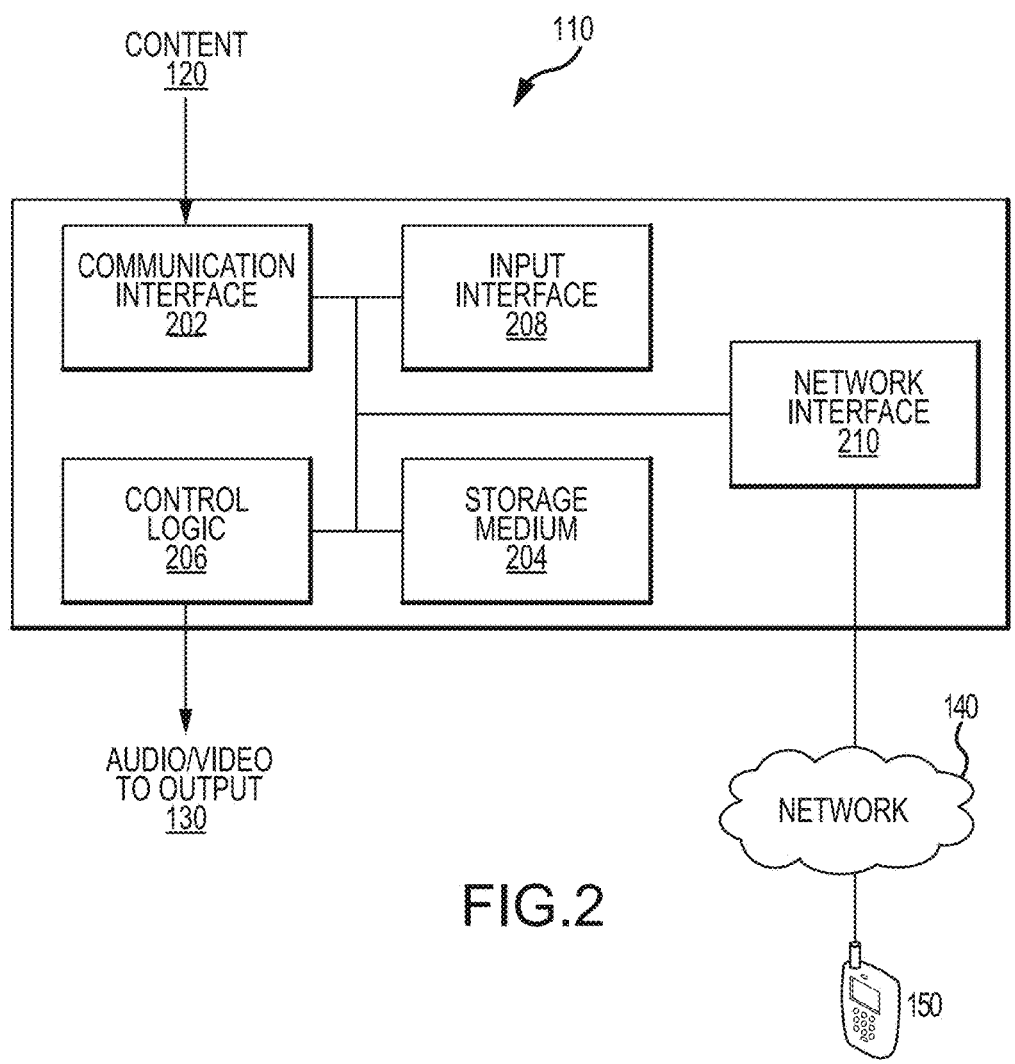
FIG. 2 illustrates certain functional components of a placeshifting device that is suitable for use with the described embodiments.

The placeshifting device 110 can be configured to transmit and place shift a live media feed from the media sources 120, an on-demand media feed from the media sources 120, and/or media content that is locally stored at the placeshifting device. In this regard, it is useful for the placeshifting device 110 to include a media content storage means, such as a digital video recorder (DVR). For example, with reference now to FIG. 2, an exemplary placeshifting device 110 includes a communication interface 202, a storage medium 204, control logic 206, an input interface 208, and a network interface 210. The placeshifting device 110 may also include other elements, components or devices.

The communication interface 202 is operable to receive content 120. More particularly, the communication interface 202 may receive media content 120 including television programming. In embodiments, the communication interface 202 may be configure to receive an over-the-air (OTA) broadcast, a direct broadcast satellite signal, a cable television signal or an internet protocol television (IPTV) signal and tune the content 120 to extract the selected television programming. The communication interface 202 may comprise multiple media input interfaces and/or multiple tuners, utilized by the placeshifting device 110 to receive and/or record multiple television programs simultaneously, such as may be provided thereto by the exemplary place-shifting system 102 described above with regard to FIG. 1. The storage medium 204 is operable to persistently store video signals recorded by the placeshifting device 110. The storage medium 204 may also store other data, such as metadata associated with the recorded video signals. The storage medium 204 may include any type of non-volatile memory appropriate for storing video signals recorded by the placeshifting device 110. Exemplary storage mediums 204 include hard drives (e.g., magnetic memory), flash memory, battery backed up memory and the like. The storage medium 204 may be internally located within the placeshifting device 110. Alternatively, the storage medium 204 may be located external to the placeshifting device 110. The placeshifting device 110 may also utilize a combination of internal and external storage mediums 204 for storage of video signals.

The input interface 208 is operable to wirelessly receive data from a remote control. The input interface 208 may communicate with a remote control utilizing any type of IR or RF communication link. The input interface 208 may receive a key code from a remote control and responsively provide the key code to the control logic 206 for processing. The data received from the remote control may be utilized by the control logic 206 to control the output of content by the control logic 206. The input interface 208 may also receive data from other devices besides the remote control, such as a mobile device 150, personal digital assistant, smartphone, tablet computer, or the like. For example, a mobile telephone, personal digital assistant, smartphone, tablet computer, or the like may include an application allowing the mobile device 150 to remotely control the placeshifting device 110 similarly to the remote control.

The control logic 206 is operable to control the operation of the placeshifting device 110. The control logic 206 may be a single processing device or a plurality of processing devices that cooperatively operate to control the operation of the placeshifting device 110. The control logic 206 may include various components or modules for processing and outputting audio/video content. Exemplary components or modules for processing audio/video content include a demodulator, a decoder, a decompressor, a conditional access module and a transcoder module. The control logic 206 coordinates storage of the content 120 onto the storage medium 204. More particularly, the control logic 206 operates to command the communication interface 202 to receive content from a specified channel and coordinates storage of the content onto the storage medium 204.

In an embodiment, the control logic 206 is operable to generate an audio/video output 130 based on the content 120, e.g., pass through the signal for display by an associated presentation device. The control logic 206 is also operable to retrieve stored video content from the storage medium 204 to generate an audio/video output 130 for display by the presentation device. The presentation device then presents the audio/video output 130 to the user. The control logic 206 may incorporate circuitry to output the audio/video streams in any format recognizable by the presentation device, including composite video, component video, Digital Visual Interface (DVI), High-Definition Multimedia Interface (HDMI), 1394, and WiFi (e.g., streaming digital video over an internet connection). The control logic 206 may also incorporate circuitry to support multiple types of these or other audio/video formats. In an embodiment, the placeshifting device 110 may be integrated with the presentation device, and the control logic 206 may be operable to control the presentation of the audio/video output 130 by the presentation device.

To coordinate the storage of the content 120, the control logic 206 is operable to receive user input requesting to record one or more television programs or other media content. For example, the user may utilize the remote control to select a program for recording that may be received by the exemplary media placeshifting device 110 as described in greater detail above. Responsive to the user input requesting to record the program, the control logic 206 identifies an originator of the recording request. For example, a user may provide identifying information in association with the request. Recording may also occur automatically to enable the suspend mode function, as described in more detail below.

With reference now to the transmission of media content/programs from the placeshifting device 110 over the network 140 to the mobile device 150, it should be appreciated that media programs may be transmitted using different communication protocols (or network protocols) and/or networks. The placeshifting device 110 and the mobile device 150 may support multiple communication protocols (e.g., Ethernet, WiMAX, WAN, Wi-Fi, and Bluetooth) and may communicate through multiple networks, wherein network 140 is preferably embodied as a cellular network. The placeshifting device 110 may transmit media programs using one or more communication protocols and/or networks.

In one embodiment, the mobile device 150 may send commands to the placeshifting device 110, instructing it to use a particular communication protocol and/or network. Therefore, users of the mobile device 150 may set rules indicating their preferences among the communication protocols and/or networks. For example, a user may set a rule instructing the placeshifting device 110 to use a cellular network, not Wi-Fi, or vice versa, to transmit media programs when both communication protocols are available. Users may also set restrictions for a communication protocol and/or network. For example, a user may prohibit the placeshifting device 110 from transmitting media programs using a cellular network between 6 AM and 9 PM. Users may also specify a particular communication protocol for the transmission. For example, a user may set a low priority for a media program, requiring the placeshifting device 110 to transmit the media program to a cellular phone overnight during non-peak hours so that the media program is available to the user for offline viewing on the cellular phone the following day.

The mobile device 150 may receive media programs in the background (i.e., while actively conducting other operations or tasks). For example, depending on the capability of the mobile device 150, a user may make phone calls, send and/or receive emails or short messages, browse the Internet, or to listen to music while the mobile device 150 is receiving media programs from the placeshifting device 110. In one embodiment, the mobile device 150 adjusts the transmission of the media programs so that the other tasks are not affected (or affected minimally) by the transmission and receipt of media content. For example, when detecting that the user is receiving or initiating a phone call, the mobile device may temporarily halt (or suspend) the transmission, switch the transmission from using the cellular network to using another network, or decrease the transmission rate. Where suspended, this is referred to herein as the "suspend mode." Additionally, when the mobile device detects that a network error has occurred that temporarily stops the media program from transmitting over the network, the mobile device may likewise temporarily halt (or suspend) the transmission, switch the transmission to another network, or decrease the transmission rate. As a result, the media program transmission may be accomplished over time and not interfere with other operations of the mobile device 150.

In one embodiment, the placeshifting device 110 may record (or cache) a media program (or a portion thereof) temporarily in a local (built-in or removable) storage after the transmission of the media program has been interrupted, for example using the DVR functionality of the placeshifting device 110 as described above. The transmission may be interrupted (e.g., the network 140 may become temporarily unavailable or a phone call may be placed or received) or slowed down (e.g., the mobile device 150 may be busy performing other tasks). Therefore, the placeshifting device 110 may record the media program (or a portion thereof) received from the media source 120 in local storage to prevent it from being lost. Once a connection between the placeshifting device 110 and the mobile device 150 is reestablished, the transmission of the media program can resume, taking into consideration the point at which the previously interrupted transmission left off.

For example, when the media content 120 is received from an over the air network, a cable network, or a satellite network, and includes live television programming, the media content may be recorded and stored on the storage means of the place shifting device upon entry into the suspend mode. In another example of entry into suspend mode, when media content 120 is received from the internet or a cable network and includes on demand programming, the media content may be either recorded and stored on the storage means of the placeshifting device, or the placeshifting device may send a command to the on demand host server to "pause" the transmission of the on demand programming to the placeshifting device. The user may determine which action to take in this circumstance as part of an initial setup operation. In yet another example of entry into suspend mode, when the media content is already stored on the placeshifting device, then playback and transmission over the network 140 may be simple paused at the device 110 until transmission can resume. A single placeshifting device may be able to enter suspend mode in each of these contexts.

Entry into suspend mode may occur at the initiation of either the placeshifting device 110 or at the mobile device 150. For example, in the case of a network error, the network interface 210 of the placeshifting device 110 determines that communication with the mobile device has ceased. Once this is determined, the network interface 206 sends a message to the control logic 206 indicating that communication with the mobile device 150 has been lost, and the control logic either instructs the storage medium to begin recording the media content 120 (in the case of live or on-demand programming), instructs the communication interface 202 to send a signal to the host server to pause the transmission of the media content 120 to the placeshifting device (in the case of on-demand programming), or instructs the store medium to pause the playback of the media content 120 (in the case of locally-stored content). In another example, in the case of a phone call being received or sent, the mobile device may automatically send a message over the network 140 to the placeshifting device 110 to enter into the suspend mode, wherein one of the above-described functions is performed. Alternatively, in this case, the user may initiate the sending of the message. A single placeshifting device 110 may be able to enter into suspend mode according to any of these means.

Exit from the suspend mode may be accomplished in any of the foregoing manners as well. It may be user-initiated at the mobile device and messaged to the placeshifting device, it may be automatically-initiated at the mobile device (e.g., the phone call ends) and message to the placeshifting device), or it may be determined at the placeshifting device by the network interface detecting resumption of the network's availability. When suspend mode is exited, transmission of the media content 120 resumes over the network 140 to the mobile device 150. The resumed transmission begins a point in time of the media content at which entry into the suspend mode occurred. For example, at the placeshifting device, exiting suspend mode may include the communication interface sending a message to the on-demand host server to resume playback, it may include the control logic 206 sending the message to resume transmission based the content that has been stored into the store medium (i.e., in place of the live or on-demand broadcast—note that the storage medium continues to record the live or on-demand broadcast as it comes to the placeshifting device because, due to the transmission interrupt, there is now both placeshifting and timeshifting of the media content 120), or it may include the control logic 206 sending a message to resume transmission based on resuming playback from the storage medium 204. A single placeshifting device may be able to exit suspend mode in any of these manners.

In another embodiment, after suspend mode, transmission may be resume at a different, second mobile device. In this case, it should be the second mobile device that sends a message to the placeshifting device indicating to exit suspend mode and the new destination of the resume transmission of the media content.

Figure 3:
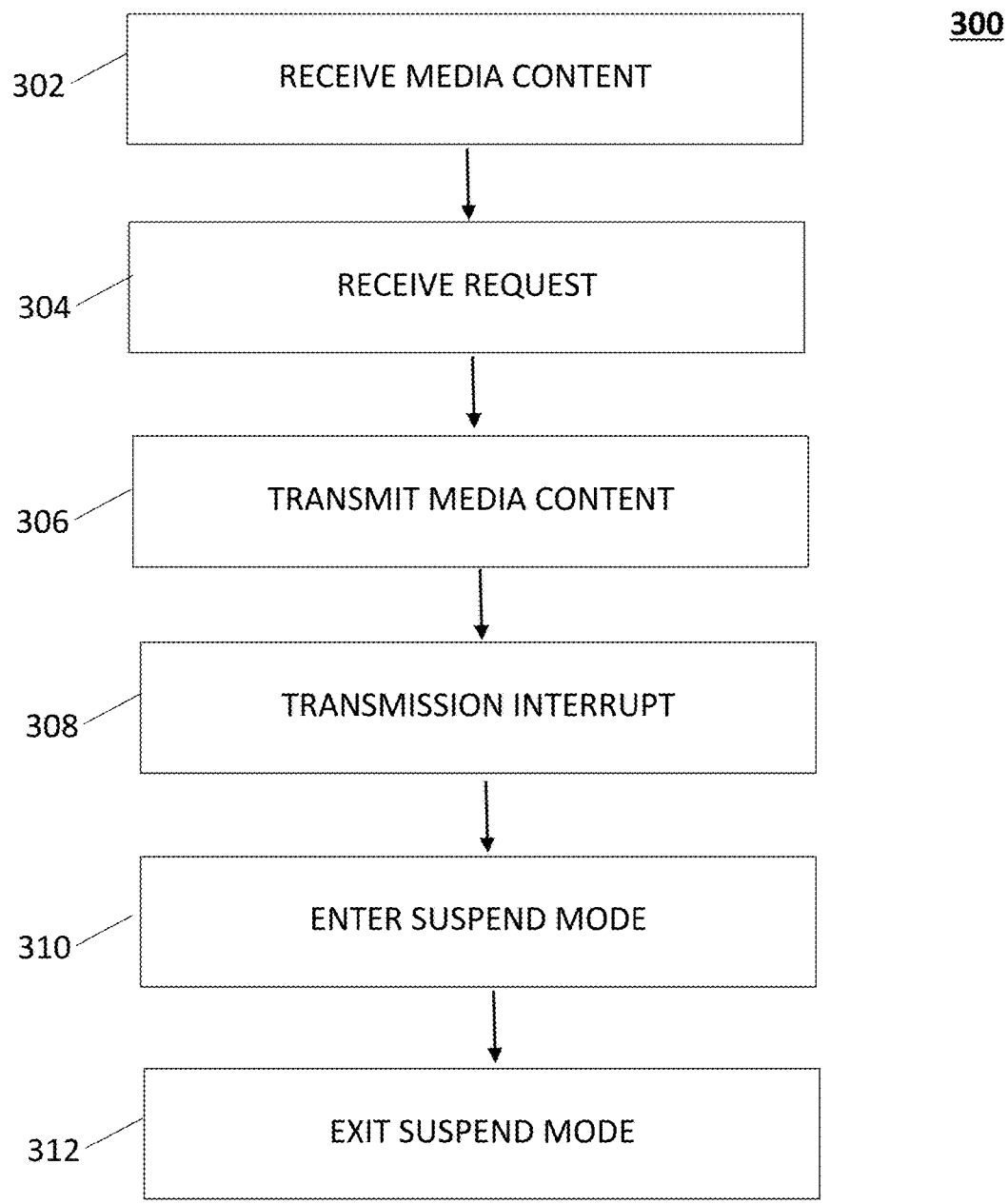
FIG. 3 illustrates a method for placeshifting media content with the use of a suspend mode in accordance with certain embodiments of the present disclosure.

Accordingly, FIG. 3 provides an exemplary method 300 for placeshifting media content employing the use of a suspend mode as described herein. At step 302, media content is received at the placeshifting device. Media content may be received from any one of a cable network, satellite network, over the air network, the internet, or from local storage such as a built-in or connected DVR. Media content may be any one of live television programming, on-demand programming, or locally stored programming. At step 304, the placeshifting device receives a request from a mobile device, via another network such as Bluetooth, WiFi, the internet, or a cellular network, to begin the transmission of the media content to the mobile device over this other network. At step 306, the placeshifting device effectively "placeshifts" the media content by transmitting the media content over the other network to the placeshifting device.

At step 308, a transmission interrupt is detected at the placeshifting device. The interrupt may be an automatic or a user-initiated message sent from the mobile device (i.e., in the event of an incoming phone call). Alternatively, the interrupt may be based on the placeshifting device's detection of lost network communication with the mobile device (i.e., in the event of a network failure). At step 310, based on the detected interrupt, the placeshifting device enters into the suspend mode. As such, live television or on-demand content may begin to be recorded at the storage medium of the placeshifting device, the placeshifting device may message the host on-demand server to pause the playback of on-demand content, or the placeshifting device may cause its own (or connected) DVR to pause playback of locally stored content.

At step 312, suspend mode is exited and transmission of content from the placeshifting device to the same (or different) mobile device is resumed. The resumed transmission begins a point in time of the media content at which entry into the suspend mode occurred. Exit from suspend mode may be initiated at the placeshifting device by detection of the network becoming available again. Alternatively, it may be initiated automatically at the mobile device or manually by the user at the mobile device when the phone call has ended. Transmission from the placeshifting device to the same (or different) mobile device resumes on the basis of timeshifted live content from the storage medium, timeshifted on demand content from the storage medium, a resumption of streaming to the placeshifting device from an on-demand host server, or a resumption of playback from the local storage device of (or connected to) the placeshifting device.

Accordingly, provided herein are embodiments of method and apparatus that relate to streaming media, such as audio and/or video data, to a mobile device using a place shifting device. Particularly, in the event that the streaming media data connection is interrupted due to an incoming phone call, a network switch, or other cause of data interruption, the systems and methods provide a "suspend mode" for the data stream that allows the user to resume streaming upon the resumption of the data connection from the point in the streaming session where data connection was interrupted.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A method for placeshifting media content with the use of a suspend mode, the method comprising the steps of:
   receiving media content at a placeshifting device;
   receiving a request at the placeshifting device from a mobile device to initiate transmission of the media content from the placeshifting device to the mobile device;
   in response to the request, transmitting the media content from the placeshifting device to the mobile device, wherein the mobile device is configured such that receiving the transmission of the media content is interrupted upon the receipt or placement of a phone call at the mobile device;
   detecting an interruption of the transmission of the media content, wherein detecting the interruption comprises receiving, at the placeshifting device, an interrupt message that was automatically generated by the mobile device in response to the receipt or placement of a phone call at the mobile device;
   based on the detecting the interruption and receiving the automatically generated message from the mobile device, automatically entering a suspend mode at the placeshifting device wherein transmission of the media content to the mobile device is temporarily suspended;
   detecting a resumption of ability to transmit media content at the mobile device, wherein detecting the resumption of ability comprises receiving, at the placeshifting device, a resumption message that was automatically generated by the mobile device in response to ending of the phone call at the mobile device; and
   based on the detecting the resumption, exiting the suspend mode and resuming transmitting the media content from the placeshifting device to the mobile device, wherein the resumed transmission begins a point in time of the media content at which entry into the suspend mode occurred,
   wherein the steps of detecting the interruption, automatically entering the suspend mode, and detecting the resumption of ability to transmit media occur based upon the receipt or placement of the phone call and without regard to any determination of network availability.

2. The method of claim 1, wherein receiving media content comprises at least one of:
   a) receiving media content over a network comprising one or more of an over the air network, a cable network, a satellite network, or the internet; or
   b) receiving one or more of a live media broadcast, an on demand media broadcast, or a playback of locally stored media content.

3. The method of claim 1, wherein receiving the request comprises at least one of:

a) receiving the request over a network comprising one or more of Bluetooth, WiFi, the internet, or a cellular network; or b) receiving the request from one or more of a cellphone, smartphone, tablet computer, or PDA.

4. The method of claim 1, wherein transmitting the media content comprises transmitting the media content over a network comprising one or more of Bluetooth, WiFi, the internet, or a cellular network.

5. The method of claim 1, wherein entering the suspend mode comprises commencing recording of live media content at the placeshifting device and wherein exiting the suspend mode comprises transmitting the recorded live media content from the placeshifting device and continuing to record live media content at the placeshifting device.

6. The method of claim 1, wherein entering the suspend mode comprises commencing recording of on demand media content at the placeshifting device and wherein exiting the suspend mode comprises transmitting the recorded on demand media content from the placeshifting device and continuing to record on demand media content at the placeshifting device.

7. The method of claim 1, wherein entering the suspend mode comprises sending a message from the placeshifting device to a host on demand server to pause transmission of on demand media content to the placeshifting device and wherein exiting the suspend mode comprises sending a message from the placeshifting device to the host on demand server to resume transmission of the on demand media content to the placeshifting device.

8. The method of claim 1, wherein entering the suspend mode comprises pausing playback of locally stored media content at the placeshifting device and wherein exiting the suspend mode comprises resuming playback of the locally store media content at the placeshifting device.

9. A placeshifting device configured for placeshifting media content with the use of a suspend mode, the placeshifting device comprising:
a content interface configured for receiving media content at a placeshifting device;
a communications interface configured for:
  a) receiving a request at the placeshifting device from a mobile device to initiate transmission of the media content from the placeshifting device to the mobile device; and
  b) in response to the request, transmitting the media content from the placeshifting device to the mobile device, wherein the mobile device is configured such that receiving the transmission of the media content is interrupted upon the receipt or placement of a phone call at the mobile device; and
a suspend mode module implemented by a controller of the placeshifting device and configured for:
  a) detecting an interruption of the transmission of the media content, wherein detecting the interruption comprises receiving, at the placeshifting device, an interrupt message that was automatically generated by the mobile device in response to the receipt or placement of a phone call at the mobile device;
  b) based on the detecting the interruption and receiving the automatically generated message from the mobile device, automatically entering a suspend mode at the placeshifting device wherein transmission of the media content to the mobile device is temporarily suspended;
  c) detecting a resumption of ability to transmit media content at the mobile device, wherein detecting the resumption of ability comprises receiving, at the placeshifting device, a resumption message that was automatically generated by the mobile device in response to ending of the phone call at the mobile device; and
  d) based on the detecting the resumption, exiting the suspend mode and resuming transmitting the media content from the placeshifting device to the mobile device, wherein the resumed transmission begins a point in time of the media content at which entry into the suspend mode occurred,
    wherein the functions (a)-(c) of detecting the interruption, automatically entering the suspend mode, and detecting the resumption of ability to transmit media are performed based upon the receipt or placement of the phone call and without regard to any determination of network availability.

10. The placeshifting device of claim 9, wherein the content interface receives media content in at least one of the following manners:
a) over a network comprising one or more of an over the air network, a cable network, a satellite network, or the internet; or
b) as a live media broadcast, an on demand media broadcast, or a playback of locally stored media content.

11. The placeshifting device of claim 9, wherein the communications interface receives the request in at least one of the following manners:
a) over a network comprising one or more of Bluetooth, WiFi, the internet, or a cellular network; or
b) from one or more of a cellphone, smartphone, tablet computer, or PDA.

12. The placeshifting device of claim 9, wherein the suspend mode module enters the suspend mode by commencing recording of live media content at the placeshifting device and wherein the suspend mode module exits the suspend mode by transmitting the recorded live media content from the placeshifting device and continuing to record live media content at the placeshifting device.

13. The placeshifting device of claim 9, wherein the suspend mode module enters the suspend mode by commencing recording of on demand media content at the placeshifting device and wherein the suspend mode module exits the suspend mode by transmitting the recorded on demand media content from the placeshifting device and continuing to record on demand media content at the placeshifting device.

14. The placeshifting device of claim 9, wherein the suspend mode module enters the suspend mode comprises sending a message from the placeshifting device to a host on demand server to pause transmission of on demand media content to the placeshifting device and wherein the suspend mode module exits the suspend mode by sending a message from the placeshifting device to the host on demand server to resume transmission of the on demand media content to the placeshifting device.

15. The placeshifting device of claim 9, wherein the mode suspend module enters the suspend mode by pausing playback of locally stored media content at the placeshifting device and wherein the suspend mode module exits the suspend mode comprises resuming playback of the locally store media content at the placeshifting device.

* * * * *